S. B. WELCOME.
WRIST PIN.
APPLICATION FILED JAN. 11, 1910.
968,213.
Patented Aug. 23, 1910.
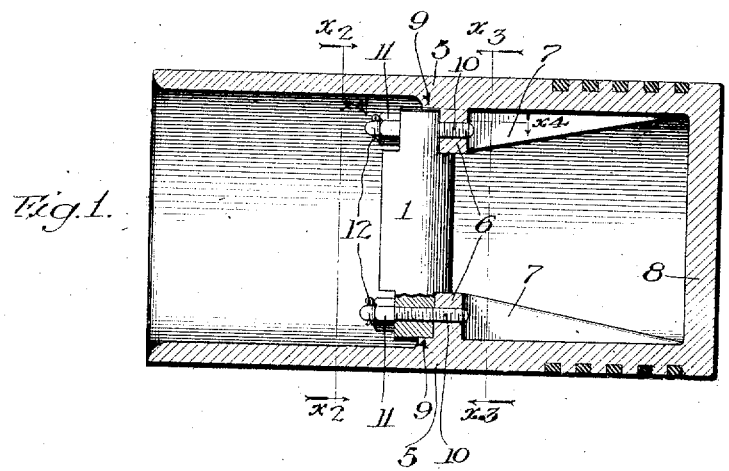
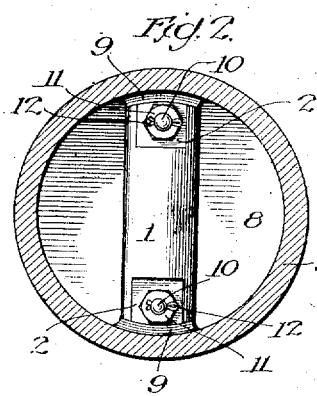
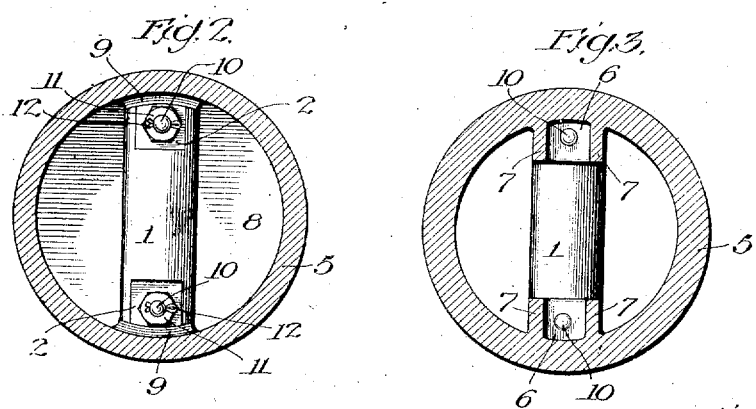
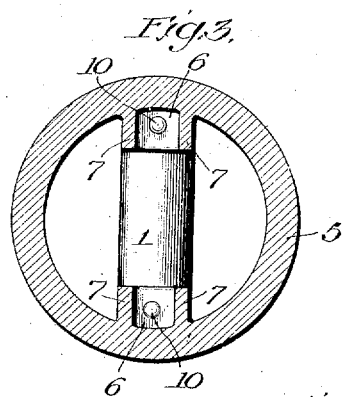
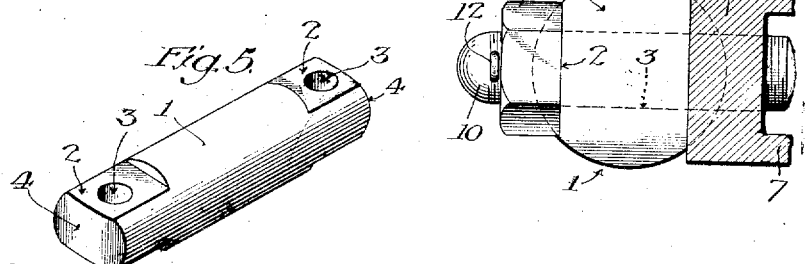
Inventor:
Solon B. Welcome,

UNITED STATES PATENT OFFICE.

SOLON B. WELCOME, OF LOS ANGELES, CALIFORNIA.

WRIST-PIN.

968,213.      Specification of Letters Patent.      Patented Aug. 23, 1910.

Application filed January 11, 1910. Serial No. 537,556.

*To all whom it may concern:*

Be it known that I, SOLON B. WELCOME, a citizen of the United States, residing at Los Angeles, in the county of Los Angeles and State of California, have invented a new and useful Wrist-Pin, of which the following is a specification.

This invention relates to wrist pins.

One of the main objects of the invention is to provide a construction of wrist pin which when worn may be turned up true and replaced in the piston and the brasses set up, thus obviating the necessity for a new pin to replace one that is worn.

Other objects of the invention are to provide a wrist pin of economical construction, which can be accurately positioned in the piston, and which can readily be tightened should it become loose, without requiring any re-fitting thereof.

A further object is to enable the wrist pin to be removed from the piston without removing the piston from the cylinder, thereby enabling the connecting rod to be more readily removed than heretofore.

In pistons which are drilled diametrically to receive the wrist pin, the pin frequently works endwise and coming in contact with the cylinder walls scores them and necessitates reboring of the cylinders. In the present construction, there is a solid wall of metal in the piston around the ends of the wrist pin so that the latter cannot possibly come in contact with the cylinder walls.

Other objects and advantages will be brought out in the following description.

Referring to the drawings: Figure 1 is a longitudinal section through a piston equipped with the wrist pin. Fig. 2 is a section on the line $x^2$—$x^2$ Fig. 1. Fig. 3 is a section on the line $x^3$—$x^3$ Fig. 1. Fig. 4 is an enlarged section on the line $x^4$—$x^4$ Fig. 1. Fig. 5 is a perspective detail of the wrist pin.

1 designates the wrist pin, each end of which is formed with flattened faces 2 and drilled at 3. Each end is also formed with a convex rounded surface 4, concentric with the axis of the piston, the said curved surface being formed by turning the ends of the pin in a lathe.

5 designates the piston which is provided with two lugs 6 diametrically opposite each other, each lug 6 being supported by two webs 7 which extend toward the head 8 of the piston. The wrist pin 1 is secured to the lugs 6, its flat faces 2 resting against the faces of the lugs 6, as shown in Fig. 1.

The piston is formed with a shoulder 9 at the base of each lug 6, which shoulders, as shown in Fig. 2, are formed with concave faces concentric with the axis of the piston which fit the rounded ends 4 of the wrist pin. This method of construction not only affords solid abutment for the ends of the wrist pin, preventing it from shifting endwise, but also serves to bring the axis of the wrist pin into intersection with the axis of the piston. In other words, it brings the wrist pin into a diametric position without requiring elaborate measurements.

Studs 10 are screwed in the lugs 6 and the holes 3 in the wrist pin slide freely over the studs to enable the wrist pin to be easily placed in position or removed. Nuts 11 are screwed on the studs against the outer flat faces 2 of the wrist pin and cotter pins 12 are inserted in the ends of the studs to prevent the nuts 11 from accidentally turning off the studs in the event that the nuts 11 become loose.

It will be observed that the wrist pin 1 is firmly held in place by the studs 10 and nuts 11, and if a slight knock should develop by reason of the nuts 11 loosening, it is a very simple matter to tighten them without removing the piston from the cylinder, as access is had to the nuts through the open end of the piston. For the same reason it is a simple matter to remove the nuts 11 to enable the wrist pin 1 to be slipped off the studs 10 when it is desired to remove the connecting rod or wrist pin.

What I claim is:

1. In combination, a piston provided with inwardly projecting lugs, a wrist pin having flat faces on its ends fitting against said lugs, and bolts passing through the wrist pin and fastening the wrist pin to said lugs.

2. In combination, a piston provided with inwardly projecting lugs, a wrist pin having flattened ends fitting against one side of said lugs, studs screwed into said lugs, the flattened ends of the wrist pin having perforations which slidably fit over the said studs, and nuts on the studs and holding the flattened ends of the wrist pin against said lugs.

3. In combination, a piston provided with inwardly projecting lugs and formed with shoulders at the base of said lugs concentric with the axis of the piston, a wrist pin having rounded ends concentric with the piston which fit the said shoulders, the ends of the wrist pin having flattened side faces which fit against the sides of said lugs, and screw studs on said lugs extending through said wrist pin, and nuts on said studs detachably securing the ends of the wrist pin to said lugs.

4. In combination, a piston provided with inwardly projecting lugs and formed with shoulders at the base of said lugs concentric with the axis of the piston, a wrist pin having rounded ends concentric with the piston which fit the said shoulders, the ends of the wrist pin having flattened side faces which fit against the sides of said lugs, studs screwed into the said lugs and projecting through perforations formed in the ends of the wrist pin, and nuts on the ends of the studs holding the ends of the wrist pin against the lugs.

5. In combination, a piston provided with a pair of inwardly projecting lugs, a wrist pin with its ends resting against the sides of said lugs opposite the head of the piston, and bolts detachably securing the ends of the wrist pin to said lugs, whereby the wrist pin may be withdrawn from said lugs in a direction away from the head of the piston.

In testimony whereof, I have hereunto set my hand at Los Angeles, California, this 27th day of December, 1909.

S. B. WELCOME.

In presence of—
G. T. HACKLEY,
FRANK L. A. GRAHAM.